8366X
D. TREADWELL.
HATCHELING FLAX AND HEMP.
Patented Aug. 18, 1834.
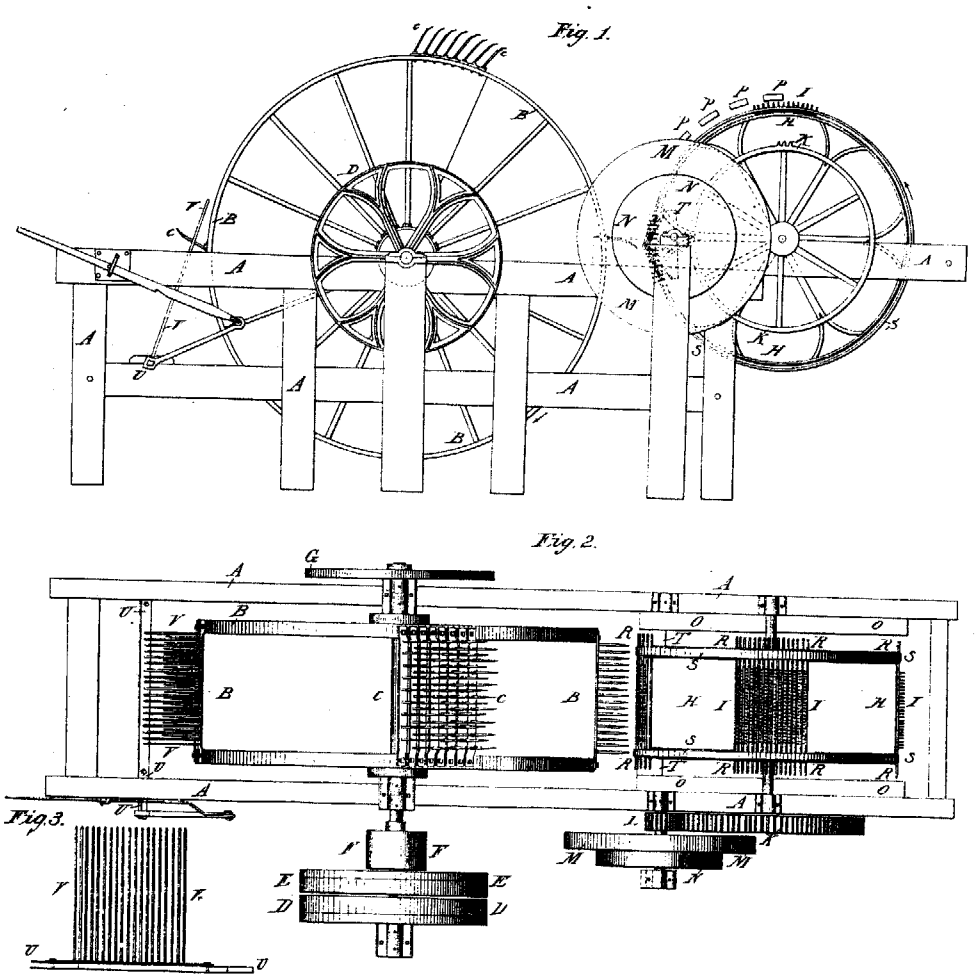
THE NORRIS PETERS CO. PHOTO-LITHO., WASHINGTON, D. C.

2439. 8-18-1834 259.

Daniel Treadwell. 8366X
Letters Patent. (Patented August 18. 1834.)

The Schedule referred to in these Letters Patent and making part of the same, containing a description in the words of the said Daniel Treadwell himself, of his improvement in the Machine for Combing or Hatchelling Hemp, Flax and Wool.

---

Know all men by these Presents, that I, Daniel Treadwell, of Boston, in the Commonwealth of Massachusetts, Engineer, have invented an improved machine for dressing, combing, or hatchelling hemp, flax, wool, and other fibrous substances.

To make the construction and mode of using this machine understood, I have hereunto annexed complete drawings of the same, which drawings are declared to make a part of this specification. Fig. 1, represents an elevation of the machine; Fig. 2, a plan. A.A.A, is a wooden frame, bearing the great cylinder B B, which is covered with steel points, or teeth, as shown at C, C. The cylinder is completely surrounded by rows of these teeth, although only a portion of them are shown in the drawings. Their form and distance will be understood from those seen at the top of Fig. 1. The cylinder B B rests its shaft in proper boxes on the frame A.A, and is furnished with the pulleys D D, E E, F F, G G. D D is a loose pulley capable of turning freely on the axle. E E, F F, G G, are fixed to the axle of B B. On the same frame A.A, is placed the small cylinder H H. This cylinder is covered with rows of teeth, a part of which only are shown in the drawings, as at I I. I may remark, moreover, that the teeth are shown in the drawing with square ends, but they are made and should have been represented with sharp points. The cog wheel K.K, is fixed upon the shaft of the cylinder H H, and is driven by the pinion L, fixed upon a shaft, which has, likewise, fixed upon it the pulleys .M.M, .N.N. Two pieces of plank O O, each of which is formed to a semi-circle, are fixed to the frame A.A, at each end of the cylinder H H. The circular edges of these planks are in such position, that a line drawn from one to the other, parallel with the axis of the cylinder, will touch the points of the teeth with which the cylinder is covered. Several bags or staves P.P.P.P, are placed over the cylinder H H, being fixed by their ends, to the planks O O. The planks O O are

8366X shown at Fig. 2, but not at Fig. 1, and the lags P P are shown at Fig. 1, and not at
Fig. 2. R R &c. represent rods or clearers, which are placed, one between every row
of . . teeth with which the cylinder is surrounded. These clearers are kept from
falling out of their places, by two belts of leather S S, which surround them, and
are secured to them by thongs. The ends of the clearers R R. project beyond the
ends of cylinder H H. There is, fixed to the inside of each of the planks O O, a wedge
or inclined plane, T T. The shape or outline of the sides of these wedges, may be
traced in the dotted line at Fig. 1. and their connection with the other parts, is seen
at Fig. 2. It will then be seen that the clearers R R, as they pass over these wedges,
are forced away from the cylinder H H, towards the cylinder B B, so as to approach
very near to the teeth of that cylinder. A shaft U, is placed across the frame
A A, where it rests in proper boxes. This shaft is commanded by an arm, to
which a weight may be attached, and handle, as seen in the drawings, and has,
moreover, fixed to it, the rack V V, seen separately, and in another view, at
Fig. 3. The bars of which the rack is formed, lay into the spaces between the teeth
on the large cylinder. An open belt must be passed round the pulley F, and the
pulley M. or if the cylinder H, should be required to move with greater speed,
then the belt should pass round the pulleys F and L. The machine is driven
by a belt passing from any proper drum, and round the pulley E E. To put the
machine in operation, it is only necessary to pass the hemp, flax, wool, or oth-
er substance to be operated upon to the cylinder H, by means of a feeding cloth
or table, properly arranged for the purpose. The large cylinder being put in motion
in the direction of the arrow, the small cylinder, from its connection with it, by the
belt pulleys and gears heretofore described, passes with the hemp or wool upon it, under
the lags or staves P P P P. These staves press the hemp or wool into the teeth I I.
When the forward ends of the material thus carried in the teeth arrive at the point
nearest to the large cylinder, the clearers R R, rising on the wedges T T, raise those
ends out of the teeth I I, and they are struck by the teeth C C, by which the operation
of clearing, combing or hatchelling, is performed. The cylinders continuing to move
in this way, when the hindermost ends of the fibres of hemp or wool, arrive at the
place of the wedge T T, the fibres slip from the teeth of the cylinder H, into those of B,
and are carried round with them, being pressed down upon the cylinder by the action of the rack VV. The supply of hemp or wool is to be continued to the cylinder HH, until the teeth of the cylinder BB are sufficiently filled, when the main belt must be guided to the pulley DD, which permits the motions of the machine to cease. The rack VV, is now to be thrown back, and the hemp, or wool, being pulled out of the teeth of BB, at any point on its circumference, is taken off in a fleece, when it may be drawn into a roving, or disposed of in any way that may be required. The drawings hereto annexed, were made from a machine for working hemp. In a machine for wool, or flax, it will be necessary to reduce the size, to conform to the staple used.

I do not claim a Patent for each part of the above described machine, in its uncombined state, but for the combination of the two cylinders, and the parts essential to their operation, as herein described.

In witness that the above is a true specification of my said invention, I have hereto set hand this sixth day of August, eighteen hundred and thirty four at Boston aforesaid.

Witnesses
A. A. Dame
Horatio M. Willis

Daniel Treadwell

Patented August 18. 1834. —

Drawing.

Exd
W.G.

(1204 wds)